United States Patent
Keister et al.

(10) Patent No.: US 10,811,988 B2
(45) Date of Patent: Oct. 20, 2020

(54) POWER MANAGEMENT UTILIZING SYNCHRONOUS COMMON COUPLING

(71) Applicant: Resilient Power Systems, LLC, Georgetown, TX (US)

(72) Inventors: Lyle Thomas Keister, Georgetown, TX (US); Joshua David Keister, Georgetown, TX (US); Bradley John Schafer, Fayetteville, GA (US); Albert Andreas Maria Esser, Austin, TX (US)

(73) Assignee: Resilient Power Systems, LLC, Georgetown, TX (US)

( * ) Notice: Subject to any disclaimer, the term of this patent is extended or adjusted under 35 U.S.C. 154(b) by 0 days.

(21) Appl. No.: 15/705,938

(22) Filed: Sep. 15, 2017

(65) Prior Publication Data

US 2018/0006570 A1 Jan. 4, 2018

Related U.S. Application Data

(63) Continuation of application No. 15/285,401, filed on Oct. 4, 2016, now Pat. No. 9,780,682.
(Continued)

(51) Int. Cl.
*H02M 5/458* (2006.01)
*H02M 7/49* (2007.01)
(Continued)

(52) U.S. Cl.
CPC ............ *H02M 5/458* (2013.01); *H02M 1/12* (2013.01); *H02M 5/4585* (2013.01); *H02M 7/49* (2013.01);
(Continued)

(58) Field of Classification Search
CPC .......... H02M 5/458; H02M 1/08; H02M 1/12; H02M 1/14; H02M 1/42;
(Continued)

(56) References Cited

U.S. PATENT DOCUMENTS

| | | |
|---|---|---|
| 3,517,300 A | 6/1970 | McMurray |
| 3,867,643 A | 2/1975 | Baker et al. |

(Continued)

FOREIGN PATENT DOCUMENTS

WO 2017062381 4/2017

OTHER PUBLICATIONS

Keister, Lyle Thomas; Supplemental Notice of Allowance for U.S. Appl. No. 15/419,142, filed Jan. 30, 2017, dated Dec. 22, 2017, 6 pgs.
(Continued)

*Primary Examiner* — Jue Zhang
(74) *Attorney, Agent, or Firm* — Taylor English Duma LLP

(57) ABSTRACT

Power management apparatuses and systems utilizing synchronous common coupling. A power management apparatus may include a plurality of ports and a plurality of electrically isolated stacks connected through a synchronous common coupling. Each electrically isolated stack may include a plurality of cascaded stages and may be connected to a source or load through one of the plurality of ports. The synchronous common coupling connects only power between each of the plurality of electrically isolated stacks and is configured to maintain electrical isolation for each of the plurality of stages in the plurality of electrically isolated stacks.

19 Claims, 10 Drawing Sheets

Related U.S. Application Data

(60) Provisional application No. 62/237,275, filed on Oct. 5, 2015.

(51) Int. Cl.
*H02M 1/12* (2006.01)
*H02M 1/00* (2006.01)
*H02M 1/32* (2007.01)

(52) U.S. Cl.
CPC .............. *H02M 2001/0074* (2013.01); *H02M 2001/0077* (2013.01); *H02M 2001/325* (2013.01)

(58) Field of Classification Search
CPC . H02M 2001/0009; H02M 2001/0074; H02M 2001/0077; H02M 2001/325; H02M 5/4585
See application file for complete search history.

(56) References Cited

U.S. PATENT DOCUMENTS

| | | | |
|---|---|---|---|
| 5,311,419 A | 5/1994 | Shires | |
| 5,625,545 A | 4/1997 | Hammond | |
| 5,815,353 A | 9/1998 | Schwenkel | |
| 5,943,229 A | 8/1999 | Sudhoff | |
| 5,982,645 A | 11/1999 | Levran et al. | |
| 6,229,722 B1 | 5/2001 | Ichikawa et al. | |
| 6,236,580 B1 | 5/2001 | Aiello et al. | |
| 6,320,767 B1 | 11/2001 | Shimoura et al. | |
| 6,747,881 B2 | 6/2004 | Schreiber | |
| 6,850,426 B2 | 2/2005 | Kojori | |
| 6,879,062 B2 | 4/2005 | Oates | |
| 7,012,822 B2 | 3/2006 | Zhu et al. | |
| 7,518,885 B2 | 4/2009 | Baurle et al. | |
| 7,787,270 B2 | 8/2010 | Nadimpalliraju et al. | |
| 7,928,592 B2 | 4/2011 | Wagoner et al. | |
| 7,940,537 B2 | 5/2011 | Abolhassani et al. | |
| 8,008,808 B2 | 8/2011 | Seeker et al. | |
| 8,045,346 B2 | 10/2011 | Abolhassani et al. | |
| 8,129,853 B2 | 3/2012 | Abolhassani et al. | |
| 8,223,515 B2 | 7/2012 | Abolhassani et al. | |
| 8,254,076 B2 | 8/2012 | Ledezma | |
| 8,279,640 B2 | 10/2012 | Abolhassani et al. | |
| 8,537,517 B1 | 9/2013 | Banak | |
| 8,643,995 B2 | 2/2014 | Nunes et al. | |
| 8,644,837 B2 | 2/2014 | Fox et al. | |
| 8,970,176 B2 | 3/2015 | Ballatine | |
| 8,976,526 B2 | 3/2015 | Kulkarni et al. | |
| 9,001,539 B2 | 4/2015 | Oh | |
| 9,093,862 B2 | 7/2015 | Dennis et al. | |
| 9,220,179 B2 | 12/2015 | Ledezma et al. | |
| 9,363,930 B2 | 6/2016 | Kulkarni et al. | |
| 9,780,682 B2 | 10/2017 | Keister et al. | |
| 9,906,155 B2 | 2/2018 | Keister | |
| 10,608,545 B2 | 3/2020 | Keister | |
| 2005/0040711 A1 | 2/2005 | West | |
| 2006/0233000 A1* | 10/2006 | Akagi | H02M 5/4585 363/37 |
| 2008/0104432 A1 | 5/2008 | Vinayak et al. | |
| 2008/0304296 A1* | 12/2008 | NadimpalliRaju | H02J 4/00 363/45 |
| 2009/0201617 A1 | 8/2009 | Yamaguchi | |
| 2010/0014325 A1 | 1/2010 | Raju et al. | |
| 2010/0073970 A1 | 3/2010 | Abolhassani et al. | |
| 2010/0148578 A1* | 6/2010 | Wagoner | H02M 7/48 307/17 |
| 2010/0213921 A1 | 8/2010 | Abolhassani | |
| 2011/0102056 A1 | 5/2011 | Brueckl et al. | |
| 2012/0262966 A1 | 10/2012 | Luerkens | |
| 2012/0299386 A1 | 11/2012 | Kaufman | |
| 2013/0175664 A1 | 7/2013 | De Rochemont | |
| 2013/0201733 A1* | 8/2013 | Divan | H02M 1/00 363/39 |
| 2013/0343089 A1 | 12/2013 | Gupta | |
| 2014/0049990 A1* | 2/2014 | Limpaecher | H02M 3/24 363/15 |
| 2014/0063871 A1 | 3/2014 | Bousfield, III et al. | |
| 2014/0140104 A1 | 5/2014 | Norrga et al. | |
| 2014/0160812 A1 | 6/2014 | Norrga | |
| 2014/0211525 A1 | 7/2014 | Ehrler | |
| 2014/0265567 A1 | 9/2014 | Zubieta et al. | |
| 2014/0300298 A1 | 10/2014 | Liu | |
| 2015/0115721 A1 | 4/2015 | Norrga et al. | |
| 2015/0171733 A1 | 6/2015 | Zargari | |
| 2016/0043556 A1 | 2/2016 | Zubieta | |
| 2016/0164427 A1 | 6/2016 | Chapman et al. | |
| 2016/0204707 A1* | 7/2016 | Takahara | H02M 1/4258 363/16 |
| 2016/0301406 A1 | 10/2016 | Mori | |
| 2017/0099008 A1 | 4/2017 | Keister | |
| 2017/0141694 A1 | 5/2017 | Keister | |
| 2018/0198377 A1 | 7/2018 | Keister et al. | |
| 2018/0301980 A1 | 10/2018 | Keister et al. | |

OTHER PUBLICATIONS

Kesiter, Lyle Thomas; Issue Notification for U.S. Appl. No. 15/419,142, Jan. 30, 2017, dated Feb. 7, 2018, 1 pg.

Keister, Lyle Thomas; Notice of Allowance for U.S. Appl. No. 15/419,142, filed Jan. 30, 2017, dated Oct. 23, 2017, 26 pgs.

Keister, Lyle Thomas; Non-Final Office Action for U.S. Appl. No. 15/486,992, filed Apr. 13, 2017, dated Nov. 15, 2017, 31 pgs.

Keister, Lyle Thomas; Issue Notification for U.S. Appl. No. 15/285,401, filed Oct. 4, 2016, dated Sep. 13, 2017, 1 pg.

Keister, Lyle Thomas; Non-final Office Action for U.S. Appl. No. 15/285,401, filed Oct. 4, 2016, dated Mar. 30, 2017, 47 pgs.

Keister, Lyle Thomas; Notice of Allowability for U.S. Appl. No. 15/285,401, filed Oct. 4, 2016, dated Jul. 11, 2017, 6 pgs.

Keister, Lyle Thomas; Notice of Allowance for U.S. Appl. No. 15/285,401, filed Oct. 4, 2016, dated May 30, 2017, 8 pgs.

Keister, Lyle Thomas; Restriction Requirement for U.S. Appl. No. 15/285,401, filed Oct. 4, 2016, dated Dec. 19, 2016, 6 pgs.

Keister, Lyle Thomas; International Search Report and Written Opinion for PCT Application No. PCT/US2016/055368, filed Oct. 4, 2016, dated Feb. 21, 2017, 15 pgs.

Keister, Lyle Thomas; Invitation to Pay Additional Fees for PCT Application No. PCT/US2016/055368, filed Oct. 4, 2016, dated Dec. 2, 2016, 2 pgs.

Keister, Lyle Thomas; Provisional Patent Application entitled: Power Conversion having U.S. Appl. No. 62/237,275, filed Oct. 5, 2015, 22 pgs.

Dixon, et al.; "Reactive Power Compensation Technologies: State-of-the-Art Review", Proceedings of the IEEE, vol. 93, No. 12, Dec. 2005, 21 pgs.

Dr. Keith Corzine; "Operation and Design of Multilevel Inverters", Developed for the Office of Naval Research, Dec. 2003, Revised Jun. 2005, 79 pgs.

Fox, et al.; "Introduction to the Clemson University 15 MW Hardware-In-The-Loop Grid Simulator", 2014 Clemson University Power Systems Conference, Charleston SC, 2014, 5 pgs.

Gutman, et al.; "EHV Transformer Bank Unbalance: Practical Issues and Solutions", IEEE Transactions on Power Delivery, vol. 11, No. Oct. 1996, 6 pgs.

Hannan, Muhammad A.; "Effect of DC Capacitor Size on D-STATCOM Voltage Regulation Performance Evaluation", Przeglad Elektrotechniczny, ISSN 0033-2097, R. 88 NR 12a/2012, 4 pgs.

Huber, et al.; "Optimum Number of Cascaded Cells for High Power Medium-Voltage Multilevel Converters", in Proceedings of the IEEE Energy Conversion Congress and Exposition (ECCE USA 2013), Devner Co, 2013, 9 pgs.

Koutroulis, et al.; "A bidirectional, sinusoidal, high frequency inverter design", IEE Proceedings—Electrical Power Appl., vol. 148, No. 4, Jul. 2001, 7 pgs.

Lai, et al.; "Multilevel Converters—A New Breed of Power Converters", IEEE Transactions on Industry Applications, vol. 32. No. 3, May/Jun. 1996. vv. 509-517, 9 pgs.

(56) References Cited

OTHER PUBLICATIONS

Lee, et al.; "Circuit-Level Comparison of STATCOM Technologies", IEEE Transactions on Power Electronics, vol. 18, No. 4, Jul. 2003, 9 pgs.

Middlebrook, R.D.; "Topics in Multiple-Loop Regulators and Current Mode Programming", IEEE Transactions on Power Electronics, vol. PE-2, No. 2, Apr. 1987, 16 pgs.

Peng, et al.; "A Power Line Conditioner Using Cascade Multilevel Inverters for Distribution Systems", IEEE Transactions on Industry Applications, vol. 34. No. 6, Nov./Dec. 1998, pp. 1293-1298., 6 pgs.

Peng, et al.; "Cascade Multilevel Inverters for Utility Applications", Proc. of the Industrial Electronics, Control and Instrumentation Conference (IECON), 1997, pp. 431-442., 6 pgs.

Peng, et al.; "Dynamic Performance and Control of a Static Var Generator Using Cascade Multilevel Inverters", IEEE Transactions on Industry Applications, vol. 33, No. 3, May/Jun. 1997, pp. 748-755., 8 pgs.

Rodriguez, et al.; "Multilevel Inverters: A Survey of Topologies, Controls, and Applications", IEEE Transactions on Industrial Electronics, vol. 49, No. 4, Aug. 2002, 15 pgs.

Tolbert, et al.; "Multilevel Converters for Large Electric Drives", IEEE Transactions on Industry Applications, vol. 35, No. I. Jan.-Feb. 1999, 9 pgs.

Tolbert, Leon M.; "Multilevel Converters as a Utility Interface for Renewable Energy Systems", 2000 IEEE, 4 pgs.

Zambrano, S.; "A DC-DC Multiport Converter Based Solid State Transformer Integrating Distributed Generation and Storage", Approved Jun. 2011 by the Graduate Supervisory Committee, 110 pgs.

Zhu, et all; "Design and Implementation of a Novel Average Current Mode PFC Controller IC", Applied Power Electronics Conference, APEC 2007—Twenty Second Annual IEEE, Feb. 25-Mar. 1, 2007, 6 pgs.

Keister, Lyle Thomas; Advisory Action for U.S. Appl. No. 15/486,992, filed Apr. 13, 2017, dated Nov. 13, 2018, 5 pgs.

Keister, Lyle Thomas; Applicant-Initiated Interview Summary for U.S. Appl. No. 15/486,992, filed Apr. 13, 2017, dated Oct. 24, 2018, 3 pgs.

Keister, Lyle Thomas; Final Office Action for U.S. Appl. No. 15/486,992, filed Apr. 13, 2017, dated Jan. 25, 2018, 27 pgs.

Keister, Lyle Thomas; Requirement for Restriction/Election for U.S. Appl. No. 15/915,604, filed Mar. 8, 2018, dated Dec. 27, 2018, 6 pgs.

Keister, Lyle Thomas; Non-Final Office Action for U.S. Appl. No. 15/486,992, filed Apr. 13, 2017, dated Dec. 28, 2018, 23 pgs.

Keister, Lyle Thomas; Non-Final Office Action for U.S. Appl. No. 15/915,604, filed Mar. 8, 2018, dated Apr. 30, 2019, 37 pgs.

Keister, Lyle Thomas; Final Office Action for U.S. Appl. No. 15/486,992, filed Apr. 13, 2017, dated Jul. 9, 2019, 21 pgs.

Keister, Lyle Thomas; Final Office Action for U.S. Appl. No. 15/915,604, filed Mar. 8, 2018, dated Sep. 4, 2019, 13 pgs.

Keister, Lyle Thomas; Notice of Allowance for U.S. Appl. No. 15/915,604, filed Mar. 8, 2018, dated Dec. 12, 2019, 11 pgs.

* cited by examiner

POWER MANAGEMENT UTILIZING SYNCHRONOUS COMMON COUPLING

CROSS-REFERENCES TO RELATED APPLICATIONS

This application is a continuation of U.S. application Ser. No. 15/285,401, filed Oct. 4, 2016, which claims the benefit of U.S. Provisional Application No. 62/237,275, filed Oct. 5, 2015, the entire disclosures of which are hereby incorporated herein by this reference.

BACKGROUND

The energy industry has depended solely on fossil fuels, but it is now shifting investment to develop new cheaper and cleaner energy sources not related to fossil fuels. Over the past two decades, renewable energy resources have been the focus for researchers, and many different power converters have been designed to make the integration of these types of systems into a distribution grid. As the power grid evolves, there will be more distributed power sources that are configured into microgrids. Microgrids operate with both utility (power network) and renewable power sources (solar, wind, battery, and/or other) with numerous various loads (single and three-phase). Medium, high, and extra high voltage electronic systems are needed to manage and control power flow as well as to assure power distribution quality in transmission lines such as applications for reactive power ("VAR") compensators, voltage/frequency regulators, solid-state transformers ("SST"), solid-state power substations ("SSPS"), medium and high voltage direct current ("MVDC"/"HVDC") drives, medium voltage alternate current drives ("MVD"), and others. Therefore, power electronic converters with these capabilities have the responsibility to carry out these tasks with high resiliency and efficiency. The increase in the world energy demands has necessitated the appearance of new power converter topologies and new semiconductor technology.

Electrical power networks produce and use real/active and imaginary/stored power. Typically, power lines carry active power ("KW") and reactive power ("VAR"). The content of active and reactive power is expressed in power factor. As the total power flows through the line, both active and reactive power compete for capacity. VAR compensation is defined as the management of reactive power to improve the performance of alternate current ("AC") power networks. The concept of VAR compensation embraces a wide and diverse field of both system and customer problems, especially related with power quality issues, since most power quality problems can be attenuated or solved with an adequate control of reactive power. In general, the problem of reactive power compensation is viewed from two aspects: load compensation and voltage support. In load compensation, the objectives are to increase the value of the network power factor, to balance the real power drawn from the AC supply, to compensate voltage regulation, and to eliminate current harmonic components produced by large and fluctuating nonlinear industrial loads. Voltage support is generally required to reduce voltage fluctuation at a given terminal of a transmission line. Reactive power compensation in transmission networks also improves the stability of the AC network by increasing the maximum active power that can be transmitted. It also helps to minimize variation at all levels of power transmission, it improves HVDC conversion terminal performance, increases transmission efficiency, controls steady-state and temporary over-voltages, and can avoid disastrous blackouts. VAR compensator systems can be electromechanical or static ("SVC") and can be series or shunt reactive compensators. Series and shunt VAR compensation are used to modify the natural electrical characteristics of AC power networks. Series compensation modifies the transmission or distribution network parameters, while shunt compensation changes the equivalent impedance of the load. In both cases, the reactive power that flows through the network can be effectively controlled, improving the performance of the overall AC power network.

Conventional multi-level cascaded power management systems use a large three-phase 60 Hz transformer with multiple electrically isolated three-phase secondaries which may be phase shifted. These conventional systems supply power to electronic assemblies that convert the 60 Hz power feeding to a variable frequency (0 to 120 Hz) and voltage output. Each output may be implemented with an H-bridge and because these outputs are electrically isolated by the large 60 Hz transformer with isolated secondaries, the H-bridges can be connected in series or parallel. However, there is a need for more efficient systems over these existing Cascaded H-Bridge ("CHB") topology.

CHB solutions are costly, complex, and unreliable because the designs are limited in switching frequency, dielectric, and thermal capability as well as requiring complicated hardware and cable assemblies. Traditionally, utilities avoid power electronic products due to cost, complexity, and lack of resiliency. In addition, these power electronic products require extra cost for installation because they are designed for operating in clean controlled environments. Within industry, many large motor applications would benefit from using power factor correction on constant speed motors, to save energy through VAR support, but most motor applications do not use power electronic solutions due to cost and reliability concerns. Due to renewable energy and the need for greater network resiliency, new electrical networks are emerging with multiple distributed energy sources rather than few large sources. The need for more flexible and efficient power flow control within a multi-source environment is well documented.

It is with respect to these and other considerations that the disclosure made herein is presented.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

According to some aspects, an exemplary power management apparatus utilizing synchronous common coupling comprises a plurality of ports, and a plurality of electrically isolated stacks connected through a synchronous common coupling. Each electrically isolated stack may comprise a plurality of cascaded stages and may be connected to a source or load through one of the plurality of ports. The synchronous common coupling may connect only power between each of the plurality of electrically isolated stacks and may be configured to maintain electrical isolation for each of the plurality of stages in the plurality of electrically isolated stacks.

According to further aspects, a method of utilizing synchronous common coupling for power management comprises the steps of receiving power from a source through at least one of a plurality of ports, wherein at least one of the plurality of ports is connected to a load, and controlling, by control circuitry, the power through a plurality of electrically isolated stacks connected through a synchronous common coupling. Each electrically isolated stack may comprise a plurality of stages connected in series and may be connected to a source or load through one of the plurality of ports. The synchronous common coupling may connect only power between each of the plurality of electrically isolated stacks and may be configured to maintain electrical isolation for each of the plurality of stages in the plurality of electrically isolated stacks.

According to further aspects, an exemplary power management array utilizing synchronous common coupling comprises three ports, a synchronous common coupling, and three electrically isolated stacks connected through the synchronous common coupling. Each of the three electrically isolated stacks may be connected to a different phase of a three-phase electrical network through one of the three ports. Each electrically isolated stack can comprise a plurality of cascaded stages. Each stage can comprise a source/load bridge, a flux bridge connected to an electrically isolated winding in the synchronous common coupling, and a direct current (DC) bus.

These and other features and aspects of the various aspects will become apparent upon reading the following Detailed Description and reviewing the accompanying drawings. Furthermore, other examples are described in the present disclosure. It should be understood that the features of the disclosed examples can be combined in various combinations. It should also be understood that certain features can be omitted while other features can be added.

BRIEF DESCRIPTION OF THE DRAWINGS

In the following Detailed Description, references are made to the accompanying drawings that form a part hereof, and that show, by way of illustration, specific embodiments or examples. Any illustrated connection pathways in block and/or circuit diagrams are provided for purposes of illustration and not of limitation, and some components and/or interconnections may be omitted for purposes of clarity. The drawings herein are not drawn to scale. Like numerals represent like elements throughout the several figures.

DETAILED DESCRIPTION

Figure 1:
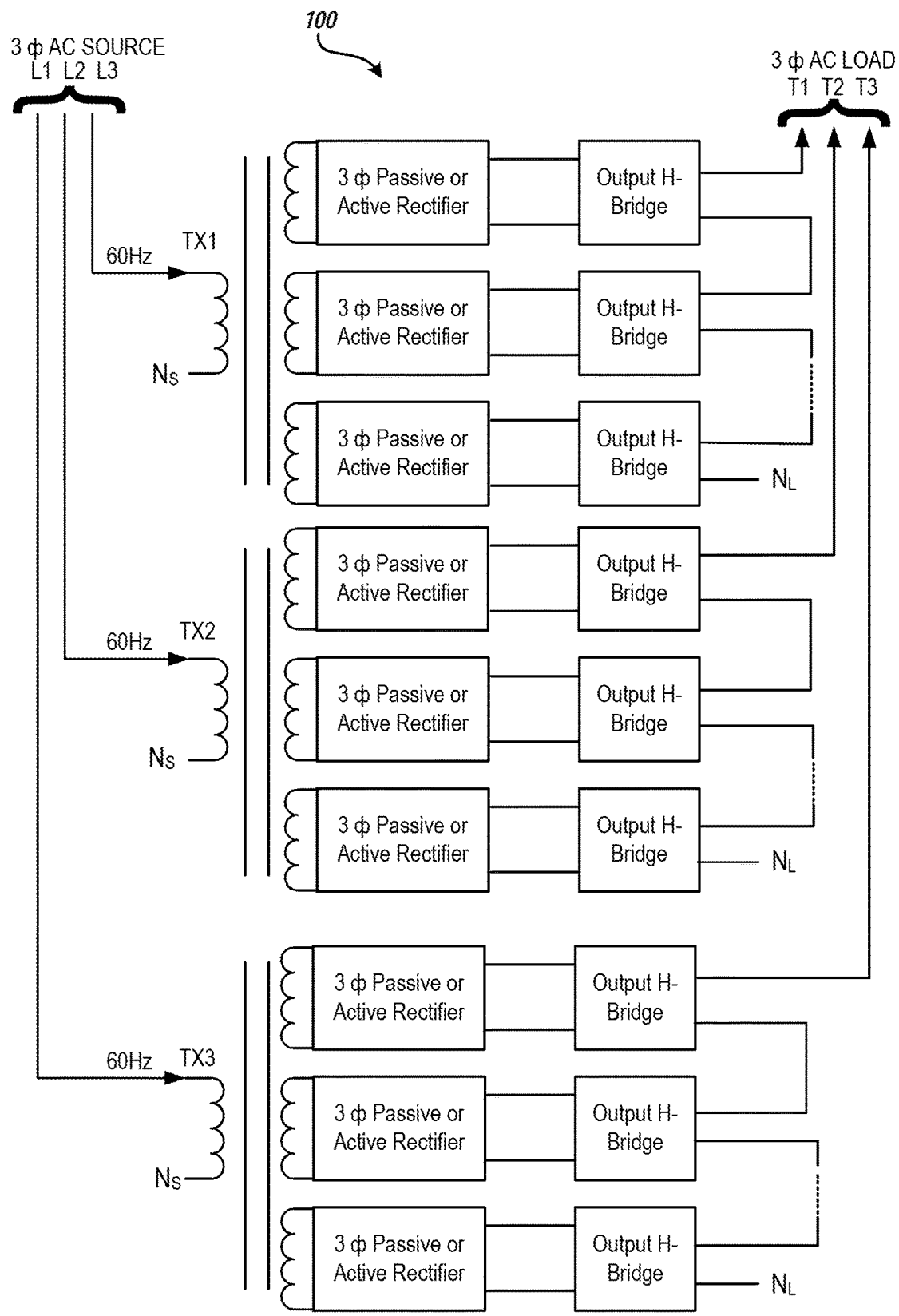
FIG. 1 depicts a block diagram of a multi-level cascaded power conversion circuit, according to prior art.

The embodiments described herein are directed to high-frequency power electronics, more particularly multi-level and multi-port cascaded power management systems with significant improvement in cost, performance, part count, size, efficiency, and resiliency over existing CHB topology. In some embodiments, synchronous common coupling may be used to link the power flow between multiple electrically isolated and non-isolated alternating current/direct current ("AC/DC") sources and loads to provide a hub for independent power flow control that is indifferent to voltage magnitude, frequency, and phase. Each power circuit may be provided with a synchronous common coupling to other power circuits to better control power, while maintaining electrical isolation between circuits.

According to embodiments described herein there are at least two different implementations of synchronous common coupling technology that may be implemented, single common flux core and high-frequency current bus. The single common flux core utilizes synchronous common coupling to exchange power directly between electrically isolated and non-isolated stages. The high-frequency current bus utilizes multiple high-frequency transformers to create a high-frequency current bus. The objective of synchronous common coupling is to instantly link power within bridge circuits internally to the CHB system while keeping electrical isolation. The bridge circuit may also be referred to herein as a "stage circuit," "stage," or "power circuit." In a CHB topology system with synchronous common coupling, each stage behaves much better than conventional power circuits, acting as if it is powered by a three-phase source with capacitance contributed by all common stages in the system. In some embodiments, the power flows from one stage to another stage through the synchronous common coupling, providing each stage with three-phase power and energy storage from other stages to reduce the number of components and improve power flow efficiency, in order to exchange power within the power management system to support reactive power compensation and phase current balancing. In some embodiments, synchronous common coupling may be unidirectional and scalable, where a DC source may be coupled to the synchronous common coupling to provide more resiliency for network transients and inertia or stored energy for the conversion system, such as the cascaded multi-level and multi-port power management systems as described herein, to provide an internal hub for independent direct power flow control that is indifferent to voltage magnitude, frequency, and phase to the electrical network.

According to some embodiments, synchronous common coupling may be accomplished by synchronously switching (e.g., high-frequency switching >10 KHz) a flux H-bridge circuit (also referred to herein as "flux bridge"), giving each stage access to power from other stages, because the synchronous common coupling serves as a node to link power of the stages together while leaving the stages electrically isolated. Synchronous common coupling allows a standard CHB control method to control the source/load H-bridge to meet various objectives, while the flux bridges lower required capacitance with minimal additional control complexity. Synchronous common coupling assists each stage to meet its input requirements by supplementing available power to each stage by synchronously linking its DC bus to every other linked stage's DC bus. Since the DC bus voltage of each stage is the same value, and each stage receives a synchronous signal to control its flux bridge, the synchronous linkage enables power flow according to the coupling impedance between stages to keep DC bus voltage levels the same value without affecting electrical isolation requirements. The common coupling power flow capability between stages is determined by the coupling impedance, i.e. the lower the impedance the higher flow capability between stages. If resonant or soft switching techniques are used within the flux bridges, the impedances between stages may be very low. The stage control continues to operate its input bridge as required per the algorithm embedded within for the application, while absorbing or transmitting power through the synchronous flux bridge and linkage as required. Each stage control has on/off cycle control for its DC bus to provide a means to avoid undervoltage or overvoltage events and intrinsic power sharing.

According to some embodiments each stage may use high volume/low cost low voltage components (typically 1200V but in some cases 600V and 1700V), however, nothing prevents the use of higher voltage components if there are cost benefits. According to some embodiments, packaging of components may utilize discrete semiconductors on a printed circuit board with embedded power circuitry and stage controller to produce the small size and low cost. Operating at higher switching frequencies reduces magnetic component size and improve product performance. Controlling power without creating harmful levels of current and voltage harmonics is provided through digital isolation circuits that have high noise immunity. In some embodiments, each stage receives a common synchronous signal from an isolated source and contains energy storage within each stage, where energy is regulated by a stage controller within each stage that sends and receives energy, and periodically supplies or receives energy to a large energy network.

According to some embodiments, one or more stages may be connected together in a stack. A stack may be the similar to a controllable high voltage semiconductor H-bridge, but uses low cost and low voltage discrete semiconductors rather than expensive higher voltage semiconductor modules. The stack assemblies are more configurable and fault tolerant as well as having much lower $\Delta v/\Delta t$, stray parasitics, temperature variation capability, and overall higher efficiency than existing 3300V, 4500V, 6500V, and 10kV commercially available semiconductor modules. According to some embodiments, a stack may be implemented with internal gate drive and power supplies so that they can be controlled by a digital control signal. This enables scalable higher power density and high-frequency operation with lower harmonics with less cost than other commercially available semiconductor module assemblies.

Synchronous common coupling significantly reduces part count and losses. It reduces the number of semiconductors, DC bus capacitance, and transformer cores, and number of windings. Using synchronous common coupling within CHB systems improves flexibility and reduces complexity by providing "true power router" capability. It enables multiple AC/DC cascaded sources and loads to efficiently share instantaneous power between phases, sources, and/or loads, indifferent to respective magnitude, frequency, phase, impedance, and other characteristics even during transient events. Another benefit of using CHB topology with synchronous common coupling, as described herein, is that it can be connected as a shunt or series regulator in various applications. It permits simple control strategies, enabling low cost and high efficiency. Synchronous common coupling may also provide advantages during commissioning, power up, and diagnostic modes. It can be tested prior to applying high voltage and surge current per switching element may be reduced due to power sharing, which also aides in pre-charging power circuits.

The embodiments described herein may provide significant advantages over existing state of the art electromechanical and power electronics power conversion products across a variety of applications, such as VAR compensation, power factor correction, voltage and frequency regulation, solid-state transformers, solid-state power substations, medium voltage AC drives, medium and high voltage DC transmission, test stands, and others. The embodiments described herein may be fault tolerant of poor network power quality and internal failures due to the many like stages connected in series, with each having its own stage controller for power flow and diagnostics.

The embodiments described herein may be implemented to compete in cost and resiliency with conventional products constructed of copper, iron, steel, aluminum, and paper. Systems utilizing embodiments described in this disclosure may be designed to be installed anywhere a transformer or switchgear is traditionally located. The embodiments described herein may be used in low, medium, and high voltage applications that require power flow control with galvanic isolation. The simplicity of the embodiments described herein result in reduced cost and higher resiliency, as well as achieving small size and high performance. In addition, the power circuits and components described in the embodiments may be submersed in high dielectric liquids to remove heat, protect the circuits from electrical or magnetic harm, and reduce both size and weight reducing overall cost while increasing reliability. Submersion may enable the components to be densely packaged and may provide better thermal and electrical properties than air. In medium and high voltage applications, submersion may enable stages and/or stacks from other sources to occupy adjacent space on a circuit board.

Further, some components used by the embodiments described in this disclosure may be implemented with soft switching and DV/DT filters along with magnetic and electrostatic shields. Further, some embodiments may also be implemented with low parasitic capacitance and inductance to reduce electrical noise interference internally between circuits.

Other examples are described in the present disclosure. It should be understood that the features of the disclosed examples can be combined in various combinations. It should also be understood that certain features can be omitted while other features can be added.

FIG. 1 depicts an example block diagram of a conventional multi-level cascaded power conversion circuit 100, as is known in the art. The multi-level cascaded power conversion circuit 100 uses a large three-phase 60 Hz transformer with multiple electrically isolated three-phase secondaries (may be phase shifted) that supply power to electronic assemblies that convert the 60 Hz power feeding to a variable frequency (0 to 120 Hz) and voltage output. Each output is an H-bridge and because these outputs are electrically isolated by the large 60 Hz transformer with isolated secondaries, the H-bridges can be connected in series or parallel, referred to as a cascaded H-bridge ("CHB") topology. Some CHB units may operate with bidirectional power flow up to 13.8 KV.

While traditional CHB topology has long been considered by industry as a possible solution three-phase AC solid-state transformer to replace traditional medium voltage transformers to achieve bi-directional power flow for multi-level cascaded power conversion, it is often too expensive to implement because large 60 Hz transformers with multi-winding secondaries, as shown in FIG. 1, are very expensive, heavy, and large, and products using them require a lot of customized assembly.

Figure 2:
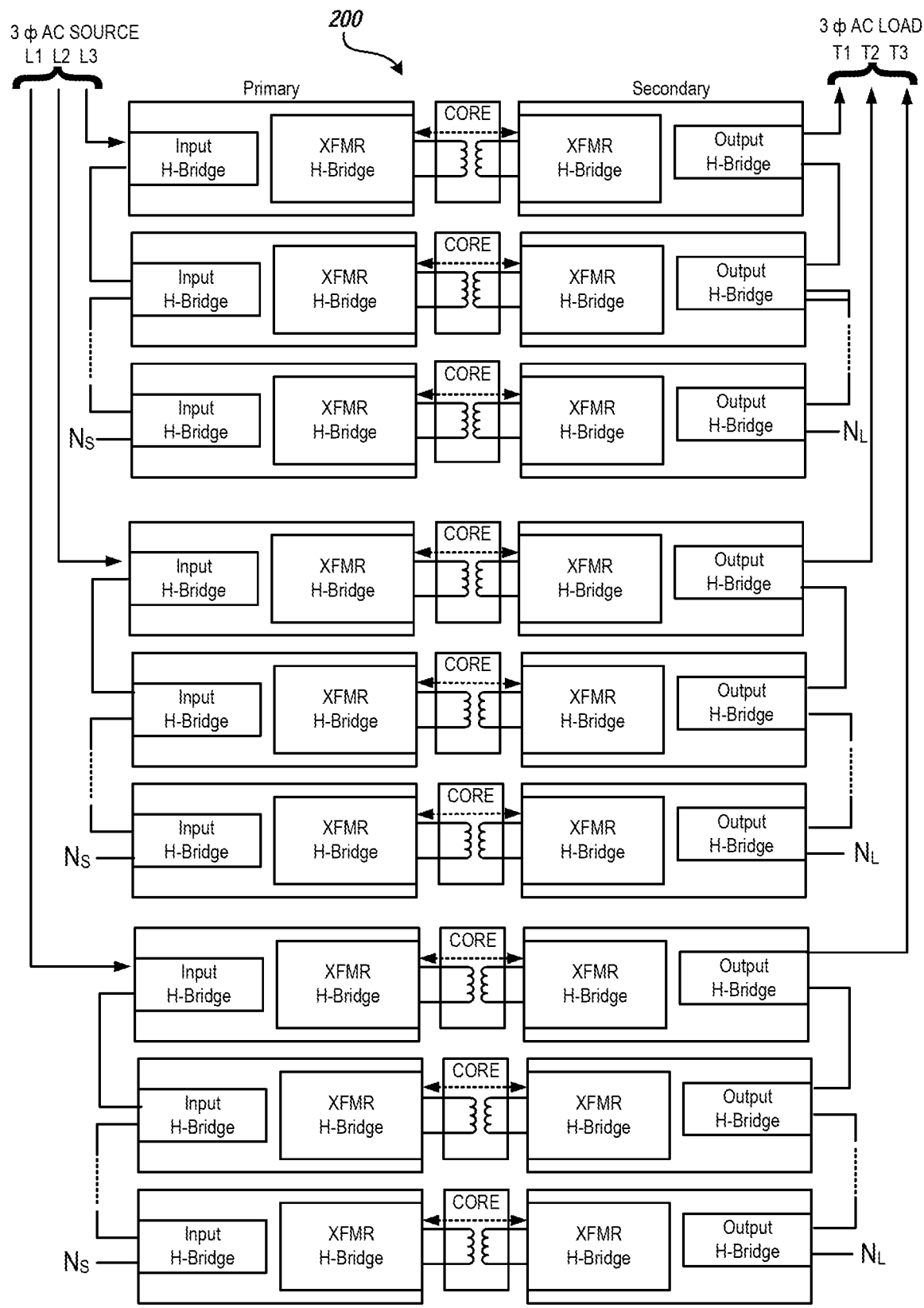
FIG. 2 depicts a block diagram for a theoretical CHB topology where line and load are in phase, according to aspects of the present disclosure.

FIG. 2 depicts a block diagram of one theoretical solution utilizing CHB topology where line and load are in phase (not intertwined). The path of the power for this example embodiment would be: AC1-DC-XFMR-DC-AC2. The main input power supplying power to AC1 contributes directly in phase with output power AC2 and all AC2 outputs are connected in series that are powered by the same main input power and are utilizing separate and distinct transformers between each bridge circuit.

Another possible solution may comprise a CHB topology where the secondary H-Bridges are intertwined so that more than one phase contributes to the power generated on the output. The path of the power for this example embodiment would be: AC1-DC-XFMR-DC-AC2. However, in this version, the main input power supplying power to AC1 contributes directly in phase with output power AC2, with each bridge circuit AC2 output intertwined with AC2 outputs from other main input power phases.

Figure 3:
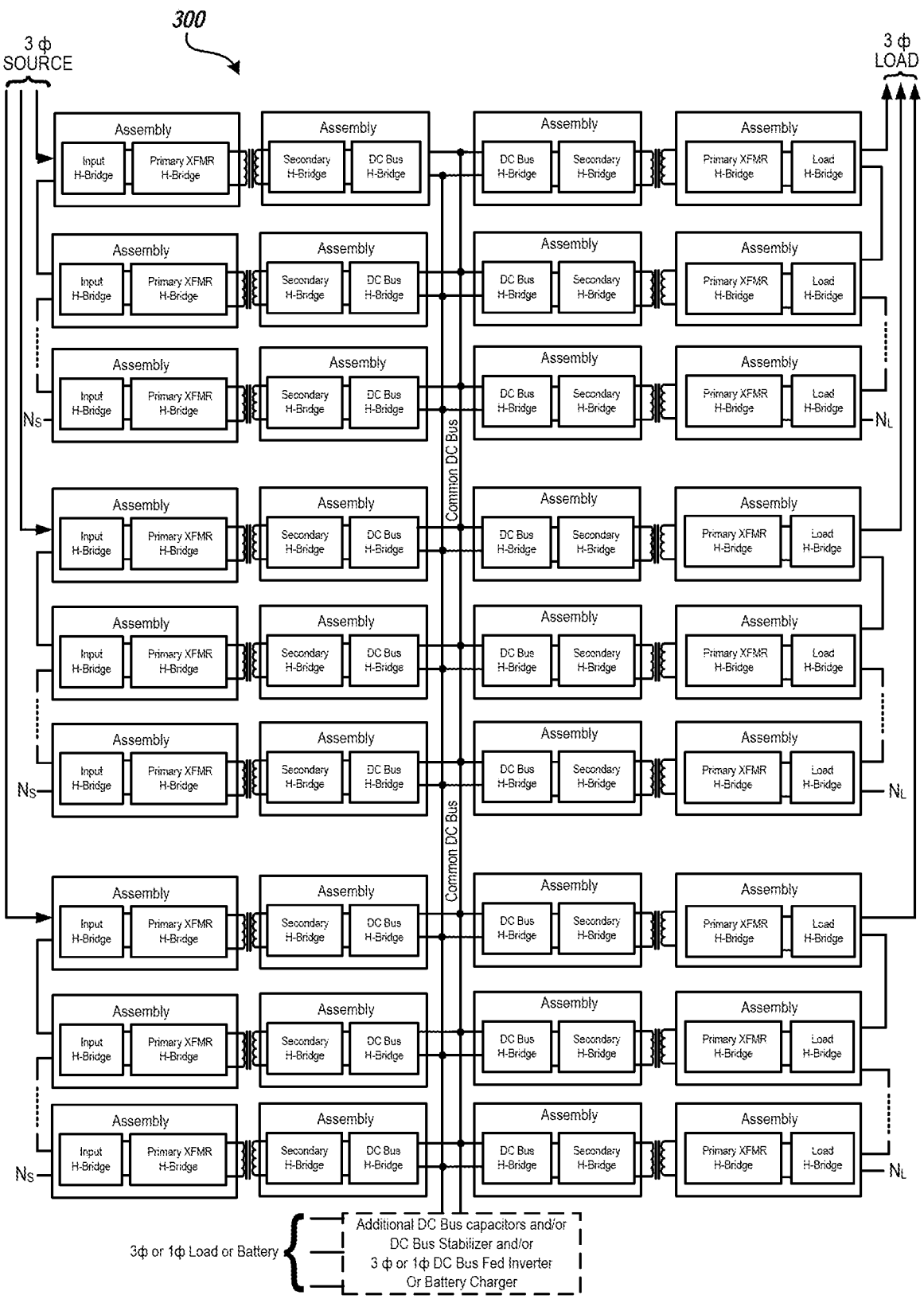
FIG. 3 depicts a block diagram for a theoretical CHB topology utilizing a common DC Bus, according to aspects of the present disclosure.

FIG. 3 depicts a block diagram for another theoretical solution utilizing CHB topology that uses a common DC Bus. The path of the current for this example embodiment in FIG. 3 would be: AC1-DC-XFMR-DC-CDC-AC2, where one phase of the three-phase main input power supplying power to AC1 supplies power to a common DC bus ("CDC"), and for non-electrically isolated loads, common DC bus power is directly converted to AC by an output H-Bridge. The path of the current may also flow as follows: AC1-DC-XFMR-DC-CDC-DC-XFMR-DC-AC2, where the main input power supplying power to AC1 supplies power to a common DC bus, and for electrically isolated loads/sources, common DC bus power is converted to AC through another electrically isolated bridge circuit.

However, the CHB solutions depicted in FIGS. 2 and 3 suffer from limited flexibility, high part count, high cost, and high losses and thus have not been implemented by the industry. An important advantage of CHB topology is that it operates on a single-phase basis rather than three-phase, and this enables H-Bridges to be connected in series. However, the traditional CHB single-phase power input requires more DC bus energy storage than three-phase systems which increases part count, cost, losses, and size. Each bridge circuit only permits power sharing between other phases, sources, and loads indirectly on the circuit's inputs and outputs. This causes for power to flow through more circuitry (semiconductors) before it gets to where it needs to go, increasing losses and part count.

Figure 4:
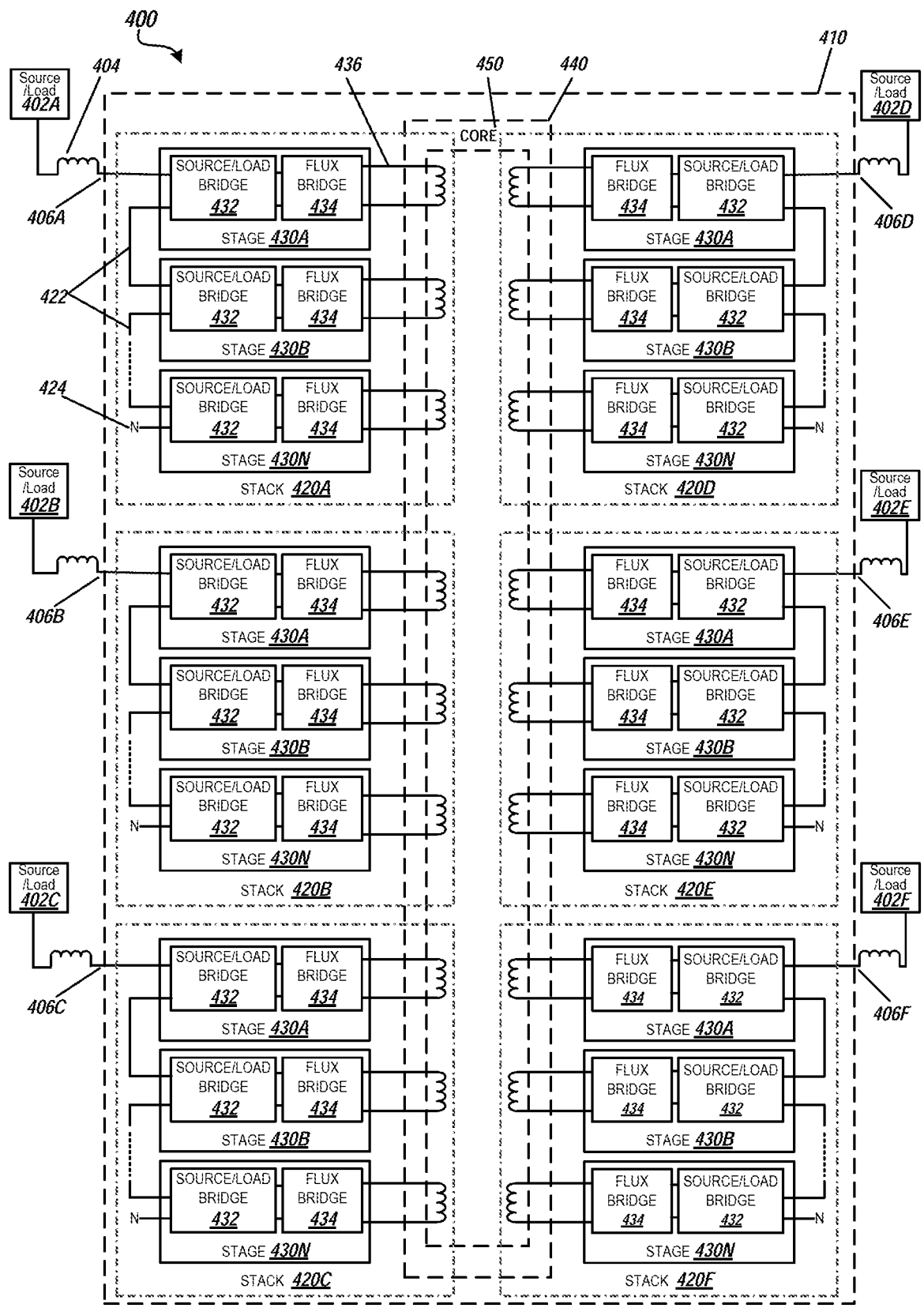
FIG. 4 depicts a block diagram illustrating a cascaded multi-level and multi-port power management system with synchronous common coupling using a single core as the coupling path, according to aspects of the present disclosure.

FIG. 4 is a block diagram illustrating a cascaded multi-level and multi-port power management system 400 with synchronous common coupling 440 using a single common flux core 450 as the coupling path, according to some embodiments described herein. In the example embodiment shown in FIG. 4, a 6-port 406A-F (also referred to herein generally as ports 406) cascaded multi-level and multi-port power management system 400 may be implemented with 6 stacks 420A-F (also referred to herein generally as stacks 420) of multiple (N) stages 430A-N (also referred to herein generally as stages 430), with each stack 420A-F connected to a respective port 406A-F. Further, the stacks 420A-F are coupled by a synchronous common coupling 440 using a single common flux core 450 as the coupling path. In the example embodiment, the stages 430A-430N of each stack 420 may be connected in series, with the last stage 430N of each stack connected to a neutral electrical connection, or "neutral" 424. Each stack neutral 424 may be electrically independent or connected to one or more other stack neutrals 424 forming a group, and each neutral 424 or group of neutrals circuits within the power conversion system may be electrically floated and/or grounded by means of a solid conductor or one or more external network components such as a resistor, a inductor, or a capacitor.

Figure 5:
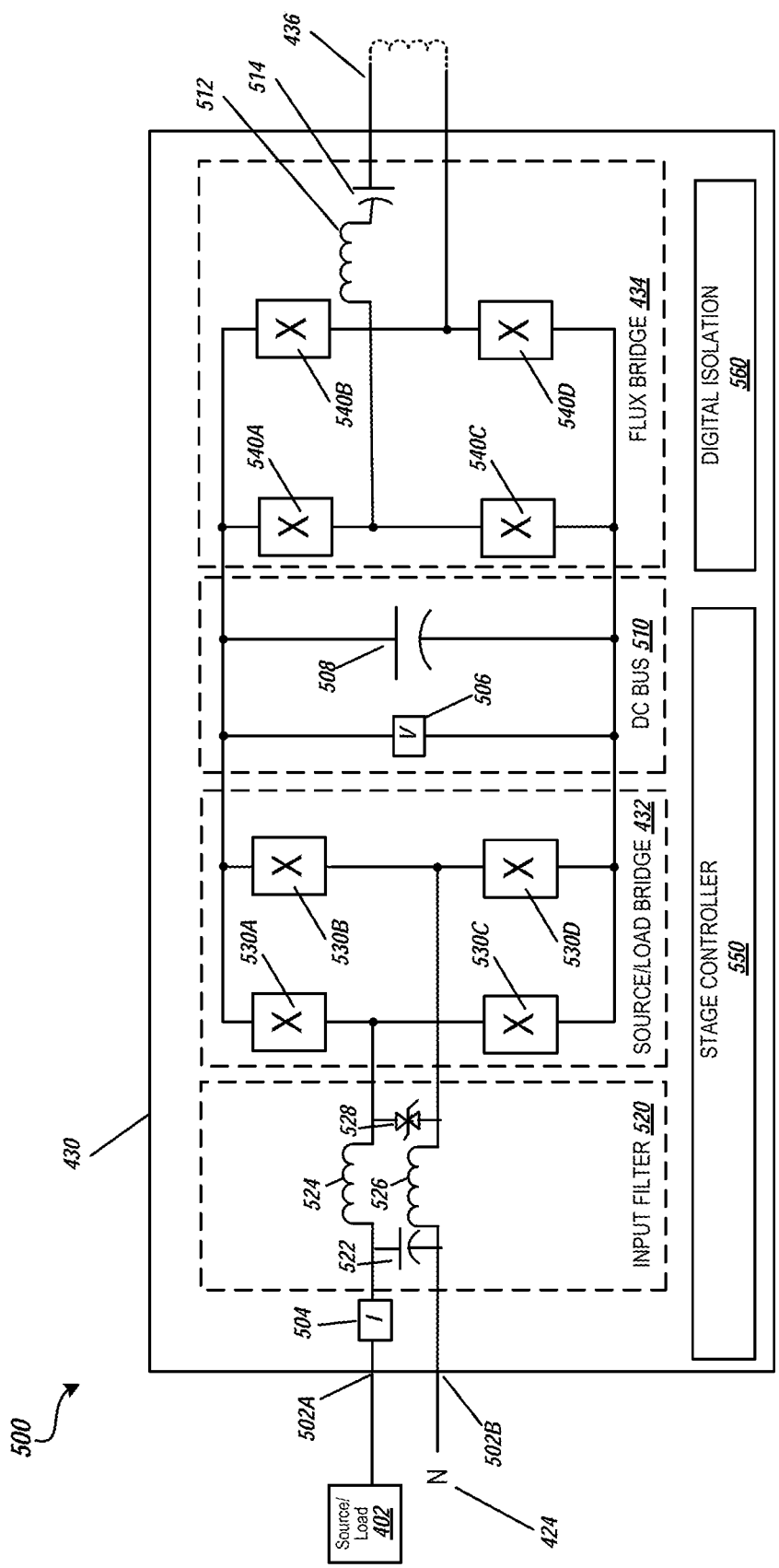
FIG. 5 depicts a block diagram illustrating a stage circuit assembly including a stage connected to a source or load, according to various aspects of the present disclosure.

FIG. 5 is a block diagram illustrating a stage circuit assembly 500, including a typical stage 430, as described herein, connected to a source/load connection 402 and/or an adjacent stage through the stage ports 502A-B, according to some embodiments described herein. The stage 430 may comprise the following sections: input filter 520, a source/load bridge 432, DC bus 510, and a flux bridge 434.

The input filter 520 may comprise an inductor/capacitor ("LC") filter comprising the electrical components that prevent the stage 430 from injecting fast $\Delta v/\Delta t$ transients into the electrical network, such as a capacitor 522, inductors 524, 526, and transient suppressor 528. The capacitor 522 and transient suppressor 528 in combination with the current regulating reactor 404 and inductors 524/526 may prevent electrical network transients from harming the stage 430. According to some embodiments, the input filter 520 may be combined with a current regulating reactor 404 (as shown in FIG. 4) to create a filter to prevent voltage and current transients on the incoming power lines or loads from harming the stage 430. The stage 430 may also have a current feedback 504 located as shown in FIG. 5, or elsewhere with the stage circuit assembly 500, to provide feedback for regulating the network current through the stage. According to some embodiments, every stage 430 within a stack 420 may provide current feedback 504. In other embodiments, only one stage 430 within the stack 420 may provide current feedback 504 for the other stages 430 since the current flowing through all series-connected stages 430 in a stack 420 will be the same value.

The source/load bridge 432 may comprise 2, 4, 6, or other number of switching devices that may be switched at high or low frequencies or a combination of both depending on the control strategy to regulate the network current. When high-frequency (>10 KHz) switching strategy is used, then fast silicon IGBTs or metal-oxide-semiconductor field-effect transistors ("MOSFETs") or Wide Band Gap MOSFETs may be used depending on required cost, efficiency, and ratings. When low frequency switching (<1 KHz) is used, then low forward saturation silicon IGBTs are possible as well as IGBT and IGCT modules. For example, the sources/load bridge 432 may comprise four switches devices 530A-D comprising insulated gate bipolar transistors ("IGBTs") configured in a conventional H-bridge configuration, as shown in FIG. 5. In other embodiments, the switching devices may comprise integrated gate commutated thyristors ("IGCTs"), wide band gap ("WBG") semiconductors, or other solid-state components in a half or full bridge, three-phase, or any other suitable configuration. The source/load bridge 432 may also be referred to herein as the "input H-bridge" or "output H-bridge." The source/load bridge 432 is used to balance power throughout the stage 430 and regulates the DC bus 510 voltage while creating a low harmonic current waveform. In further embodiments, the DC bus 510 may comprise a DC bus capacitor 508 to provide a low inductance path for the switches, assist in minimizing DC bus ripple voltage, protect the switches from voltage transients, or the like. The source/load bridge 432 may provide wide input voltage variation to provide the regulated DC bus 510.

The source/load bridge 432 uses (for example 1-20 kHz) pulse width modulate ("PWM") switching to reduce current and voltage harmonics. When more than one stage 430 is used, the carrier frequency that generates the PWM switching may be phase shifted per each stage to effectively create a higher switching frequency than the actual PWM carrier—the more stages 430A-N used, the higher the effective switching frequency. This technique may improve control and current waveform without penalizing the efficiency of the source/load bridge 432.

According to embodiments, the power flows from one stage 430 to another stage 430 through the synchronous common coupling 440. In some embodiments, this results in each stage 430 being provided with three-phase power and energy storage from other stages to reduce each stage requirements for DC bus capacitance. The network current (or power flow) of the stage 430 may be unidirectionally or bidirectionally controlled by the source/load bridge 432, which uses one or more current regulating reactors per source or load to regulate network current or power flow by switching at least one source/load bridge 432 on/off. In some embodiments, if the DC bus 510 of the stage 430 does not have enough power to satisfy the network's current demands, then the DC bus 510 voltage begins to drop. However as the DC bus 510 voltage drops, other stages 430 can supply power to the DC bus 510 of that stage through the synchronous common coupling 440.

In further embodiments, the source/load bridge 432 is designed to provide a bypass of the stage 430 in the case of a failed power component or some control failures. If the source/load bridge 432 fails to operate properly, the source/load bridge 432 is designed to naturally, or through positive control, deliberately turn on the power devices within the source/load bridge 432 continuously to short out the power input to stage 430. In cases, where the stages 430 are connected in parallel, a means of disconnecting the failed stage 430 from other parallel healthy stages 430 may be provided, such as a fuse, contact, semiconductor, and/or the like. According to some embodiments, the switching devices of the source/load bridge 432 and the flux bridge 434 may have overcurrent sensing for protection.

Further, the source/load bridge 432 is controlled by a stage controller 550 to regulate current, DC bus voltage, and the power for the stage 430, stack 420, and array 410 to specified values. The source/load bridge 432 semiconductors 530A-D may be switched at high or low frequencies or a combination of both depending on the control strategy to regulate the network current. When high-frequency (>10 KHz) switching strategy is used, then fast silicon IGBTs or metal-oxide-semiconductor field-effect transistors ("MOSFETs") or Wide Band Gap MOSFETs may be used depending on required cost, efficiency, and ratings. When low frequency switching (<1 KHz) is used, then low forward saturation silicon IGBTs are possible as well as IGBT and IGCT modules.

Similarly to the source/load bridge 432, the flux bridge 434 may comprise two, four or any other number of switching devices (IGBT, IGCT, WBG, etc.) in a half, full or other suitable topology bridge configuration. For example, the flux bridge 434 may comprise four switches devices 540A-D comprising IGBTs configured in a conventional H-bridge configuration, as shown in FIG. 5. The flux bridge 434 may operate on a simple symmetrical duty cycle. The actual operating frequency may be determined by the type of device used.

The flux bridge 434 output may connect to an electrically isolated winding 436 located on high-frequency transformer core (for example 25 kHz to 250 kHz) in the synchronous common coupling 440. If more than one stage 430 is used, the electrical winding 436 may be located on a common high-frequency transformer core. According to embodiments, the stage controller 550 for each flux bridge 434 circuit is synchronized so that power to the windings 436 of each stage 430 are in phase and at the same frequency. The power through the flux bridge 434 may be bi-directional. If so, the bridge rectifies the voltage and passes power to the DC bus 510 which is regulated by the source/load bridge 432. The switching devices 540A-D of the flux bridge 434 are switched synchronously with other flux bridges 434 of other stages 430 within each array 410 at high-frequency (e.g., >10 KHz) to reduce the size of the single common flux core 450 (or cores 602) and the number of turns in the winding 436 of the synchronous common coupling 440, as is further described herein.

In some embodiments, the flux bridge 434 may be soft-switched through a resonant capacitor 514 and/or inductor 512 connected in series with the windings 436. In other embodiments, the flux bridge 434 may be may be hard switched, without the use of the resonant capacitor 514 and inductor 512. In some embodiments, the flux bridges 434 of one or more stages 430 may temporarily change switching frequency to enable better power flow. In some embodiments, the current to the winding 436 may be monitored with a current shunt or an isolated current sensor by the stage controller 550.

The stage controller 550 may control the switching devices 530A-D and 540A-D of the source/load bridge 432 and flux bridge 434 by switching them on and off utilizing PWM switching. The stage controller 550 may utilize an average current mode controlled power factor correction algorithm or the like. The stage controller 550 may comprise a DC-DC power supply powered by a wireless power supply which has a transmitter in the cell and a receiver (not shown) on the stage 430, a DC-DC converter that receives its power from the DC bus 510, or other power means. The power supply for the stage 430 may receive back-up power from control power of an adjacent stage when more than one stage 430 exists.

In some embodiments, the DC bus 510 may comprise DC bus capacitors 508, a voltage feedback circuit 506, and a DC-DC power supply. The voltage of the DC bus 510 may be regulated by the source/load bridge 432 via the stage controller 550, and may be measured via a power resistor divider network. In some embodiments, the power management system may be implemented with digital isolation circuits 560 that have high noise immunity that may provide fast digital control from each stage 430 to a particular stage within a stack 420.

According to some embodiments, the stage controller 550 may be implemented to direct the source/load bridge 432 to control the AC current. According to some embodiments, the stage controller 550 may comprise shunt resistors to measure the current. In some embodiments, the AC/DC input voltage may be measured at each stack 420, at each stage 430, or at the stage controller 550. In some embodiments, if the incoming voltage is AC, the phase angle and a synchronized signal representing the zero crossing(s) may be communicated throughout the power management system 400. In some embodiments, the stage controller 550 may comprise feedback sensors to detect temperature near the stage 430, the stage controller 550, the DC bus capacitor 508, and/or the transformer winding 436.

Referring again to FIG. 4, according to some embodiments, the power management system 400 may be implemented with a minimum of two ports 406 with the maximum number being unlimited. In the example 6-port system shown in FIG. 4, there are 6 ports 406A-F (also referred to herein generally as ports 406). In the example embodiment, each port 406A-F is a bidirectional power port and may be connected to a power source or a load, as shown at 402A-F. In some embodiments, the current harmonics may be minimized by means of a current regulating reactor 404 located between the port 406A-F and the corresponding source/load connection 402A-F. The current regulating reactor 404 may also provide protection from lightning or large fast network voltage transients.

According to some embodiments, the power management system 400 may be bidirectional through ports 406 such that the array is indifferent to whether a source or a load connection 402 is connected at each port 406. As shown in FIG. 4, the power management system 400 may comprise of one array 410, with three stages 430 in each of six stacks 420A-F. A stack 420 may comprise one or more stages 430 connected in a series connection string 422, according to some embodiments. An array 410 may comprise a group of two or more stacks 420 combined with a synchronous common coupling 440. According to some embodiments, an array 410 may be connected in series and/or parallel with other arrays.

According to some embodiments, a stack 420 may be configured to control power bi-directionally at its configured input, which may also be an array port 406, from the corresponding source/load connection 402. According to some embodiments, if one stage 430 fails, the stack 420 may attempt to short its input by permitting the voltage to rise across the input enough for the semiconductors to fail shorted and the rest of the array 410 continues to operate through redundant stages 430A-N within the series circuit, or stack 420. If the internal failure occurs in such way that the whole or much more of the array 410 is damaged, then other redundancy measures are available such as configured parallel arrays 410. Each stage 430 is provided with a means of synchronous common coupling 440 to other stage 430 to better control power, while maintaining electrical isolation between stages 430. The cascaded multi-level and multi-port power management system 400 may operate in VAR compensation configuration, also referred to herein as a "shunt," or in a power conversion configuration, also referred to here as "series" or "transformer" configuration, within the electrical network depending on application.

In some embodiments, the synchronous common coupling 440 utilizes a single common flux core 450 to exchange power directly between electrically isolated and non-isolated stages 430A-N of the stacks 420A-F, as shown in the example embodiment of the cascaded multi-level and multi-port power management system 400 in FIG. 4. The path of the power for this example embodiment would be: AC1-DC-COMMON FLUX CORE 450. In other words, within each stage 430, a port 406 (connected to source/load connection 402) is connected to the source/load bridge 432 (which is referred to here as AC1) and input power is converted to "regulated DC voltage." The regulated DC voltage is synchronized to the synchronous common coupling 440 by the flux bridge 434 and connected through the winding 436 to the common flux core 450, which links the power to other stages 430A-N in the system. There are multiple windings 436 wound on the single common flux core 450, with each winding connected to a stage 430, which creates the synchronous common coupling 440. According to some embodiments, each array 410 in the power management system 410 may have its own synchronous common coupling 440, such as the common flux core 450 shown in FIG. 4. In other embodiments, the power management system 410 may comprise multiple arrays 410, each having separate synchronous common couplings 440 or multiple arrays sharing a same synchronous common coupling.

In power management systems 400 utilizing a single common flux core 450, high-frequency flux travels within the core 450 to other windings 436 distributed on the single common flux core 450. For resonant operation, the synchronous common coupling 440 behaves best for lowest leakage flux values and smallest leakage variation in the single common flux core 450. In some embodiments, an external inductor may be used in high-frequency power supply circuits to minimize the effects of leakage variation. In some embodiments hard switching the flux bridge 434 and windings 436 may be used.

Figure 6:
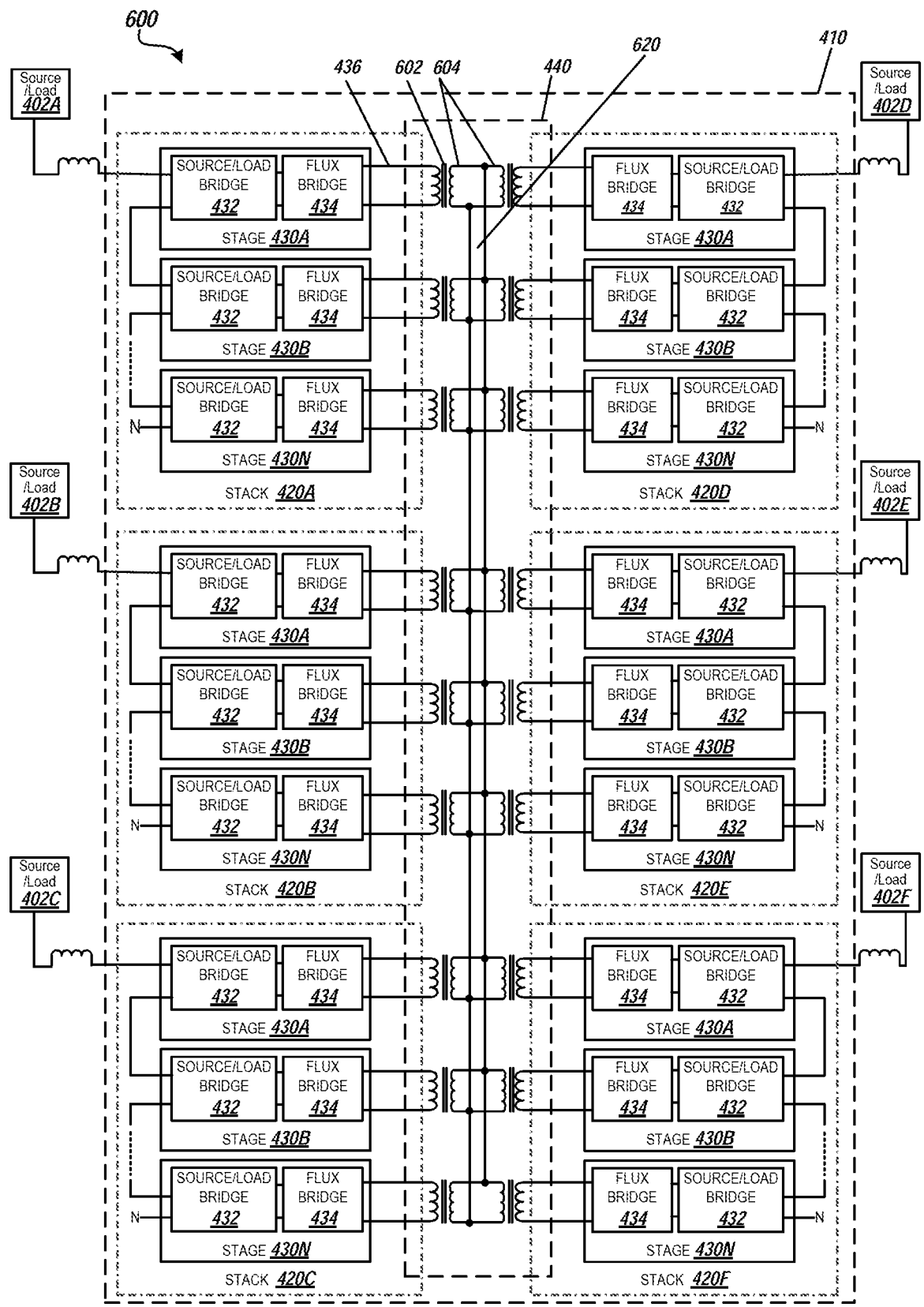
FIG. 6 depicts a block diagram illustrating a cascaded multi-level and multi-port power management system with synchronous common coupling using multiple high-frequency transformers as the coupling path, according to various aspects of the present disclosure.

FIG. 6 is a block diagram illustrating a cascaded multi-level and multi-port power management system 600 with the synchronous common coupling 440 comprising multiple high-frequency transformers to create a high-frequency current bus 620, according to some embodiments described herein. As shown in FIG. 6, an exemplary cascaded multi-level and multi-port power management system 600 may comprise six ports 406A-F with one array 410. According to some embodiments, the power management system 600 may be implemented with one transformer 602 per stage 430. In some embodiments, multiple stages 430A-N may utilize a single transformer 602 with a single core and separate windings for each stage, combining the features of both the single common flux core 450 and the high-frequency current bus 620.

For example, the cascaded multi-level and multi-port power management system 600 may be implemented in which the synchronous common coupling 440 utilizes multiple cores that exchange power directly between secondary windings connected together through the high-frequency current bus 602 and powered by electrically isolated stages 430A-N. The path for power in this example embodiment would be: AC1-DC-XFMR-COMMON FLUX COUPLING. In other words, within each stage 430, a port 406 (connected to a source/load connection 402) is connected to the source/load bridge 432 (which is referred to here as AC1) and input power is converted to "regulated DC voltage." The regulated DC voltage is synchronized to the synchronized common coupling 440 through the flux bridge 434 and connected to a transformer 602 with at least one primary winding 436. A secondary winding 604 of the transformer 602 transfers the power to all stages 430 in the array 610 through the high-frequency current bus 620, as shown in FIG. 6. According to some embodiments, the cascaded multi-level and multi-port power management system 600 may be implemented with the high-frequency current bus 620 utilizing selection and switching frequency to minimize leakage inductance and meet efficiency requirements.

According to some embodiments, multiple core systems may be implemented with a high-frequency current bus 620 flowing from primary winding 436 to secondary windings 604 through the core 602 to other stages 430A-N via the secondary windings 604 which are connected in parallel within the array 610. For resonant operation, the synchronous common coupling 440 behaves best for lowest leakage flux values and smallest leakage variation in the core 602. In some embodiments, an external inductor may be used in high-frequency power supply circuits to minimize effects of leakage variation. In some embodiments, hard switching the flux bridge 434 and windings 436 may be used.

Figure 7:
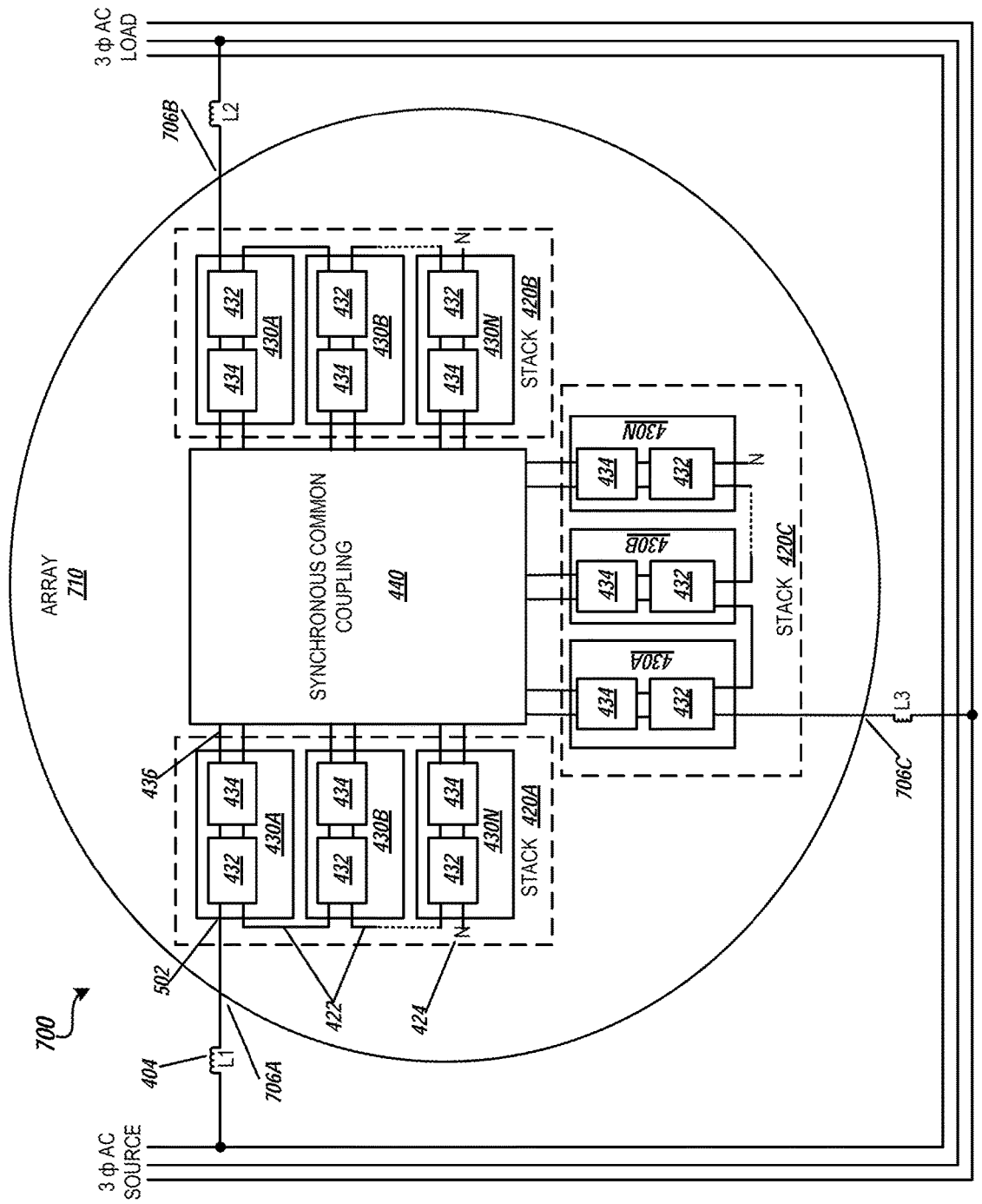
FIG. 7 depicts a block diagram illustrating a multi-level and multi-port cascaded power management system with common flux coupling utilizing a 3-port array, according to various aspects of the present disclosure.

FIG. 7 depicts a block diagram illustrating a multi-level and multi-port cascaded power management system 700 with synchronous common coupling 440 and a 3-port array 710 in a "coin" configuration, according to some embodiments described herein. According to some embodiments, the multi-level and multi-port cascaded power management system 700 may be implemented with one array 710 connected to a three-phase AC power network to act as a VAR compensator or "shunt regulator." In other embodiments, this configuration may be utilized for line balancing, transformer impedance matching, or the like.

As shown in FIG. 7, an exemplary array 710 may comprise three stacks 420A-C, where each stack 420 comprises of multiple stages 430A-N, and each stack 420 is connected in series. In other embodiments, the number of stages 430, stacks 420, and arrays 710 used to form a power management system may depend on the network operating voltage and power. According to further embodiments, in a multi-level cascade converter, each stage 430 may contribute to the voltage and power on a single-phase basis, where the actual voltage and power rating of the array 710 depends on the number of stages 430A-N used and at what power and voltage each one is utilized. According to some embodiments, the voltage of the multi-level and multi-port cascaded power management system 700 may be normally distributed evenly, whereas the power contribution may also be the same or vary.

Figure 8:
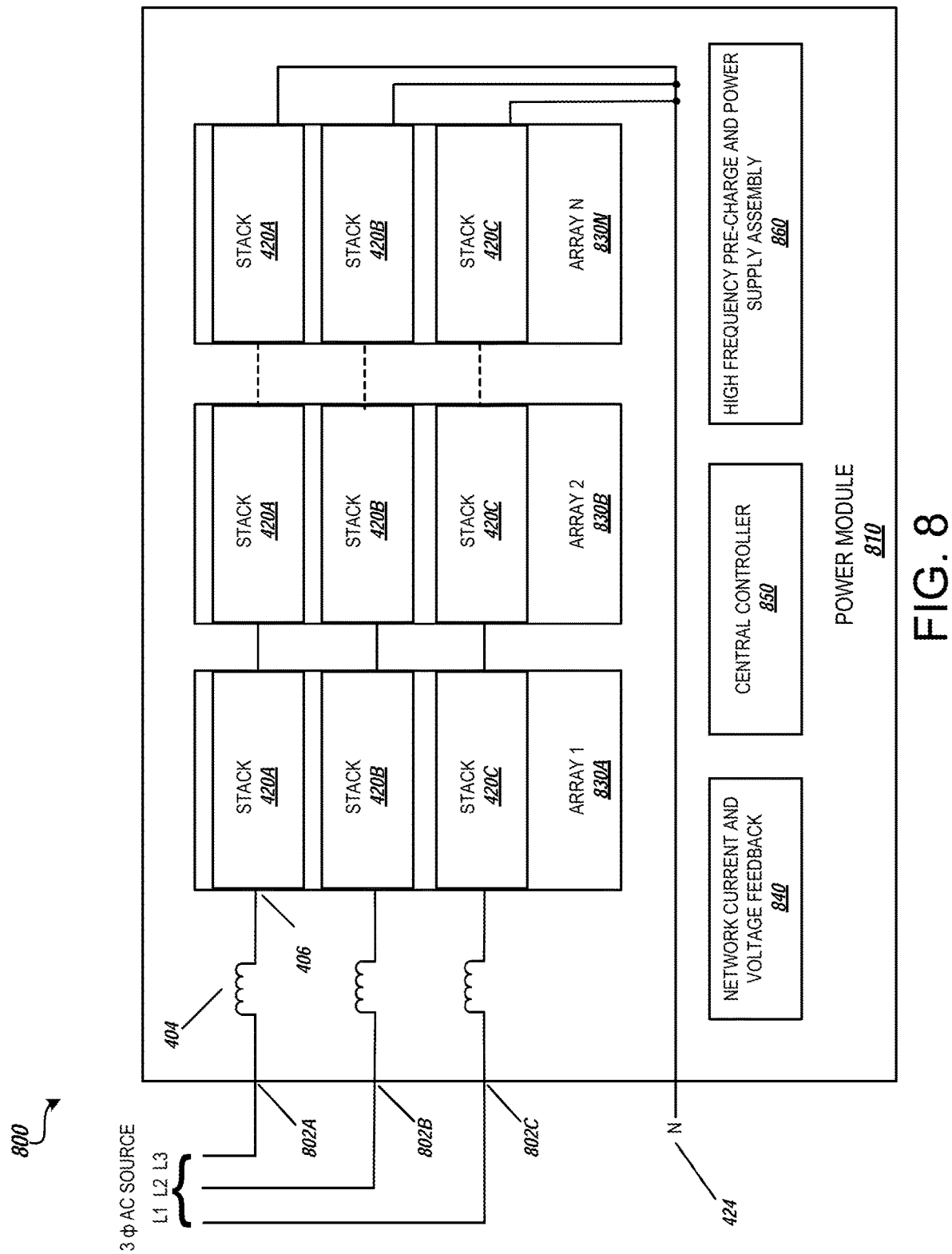
FIG. 8 depicts a block diagram illustrating one embodiment of a cascaded multi-level and multi-port power management system with synchronous common coupling in a power module, according to various aspects of the present disclosure.
Figure 9:
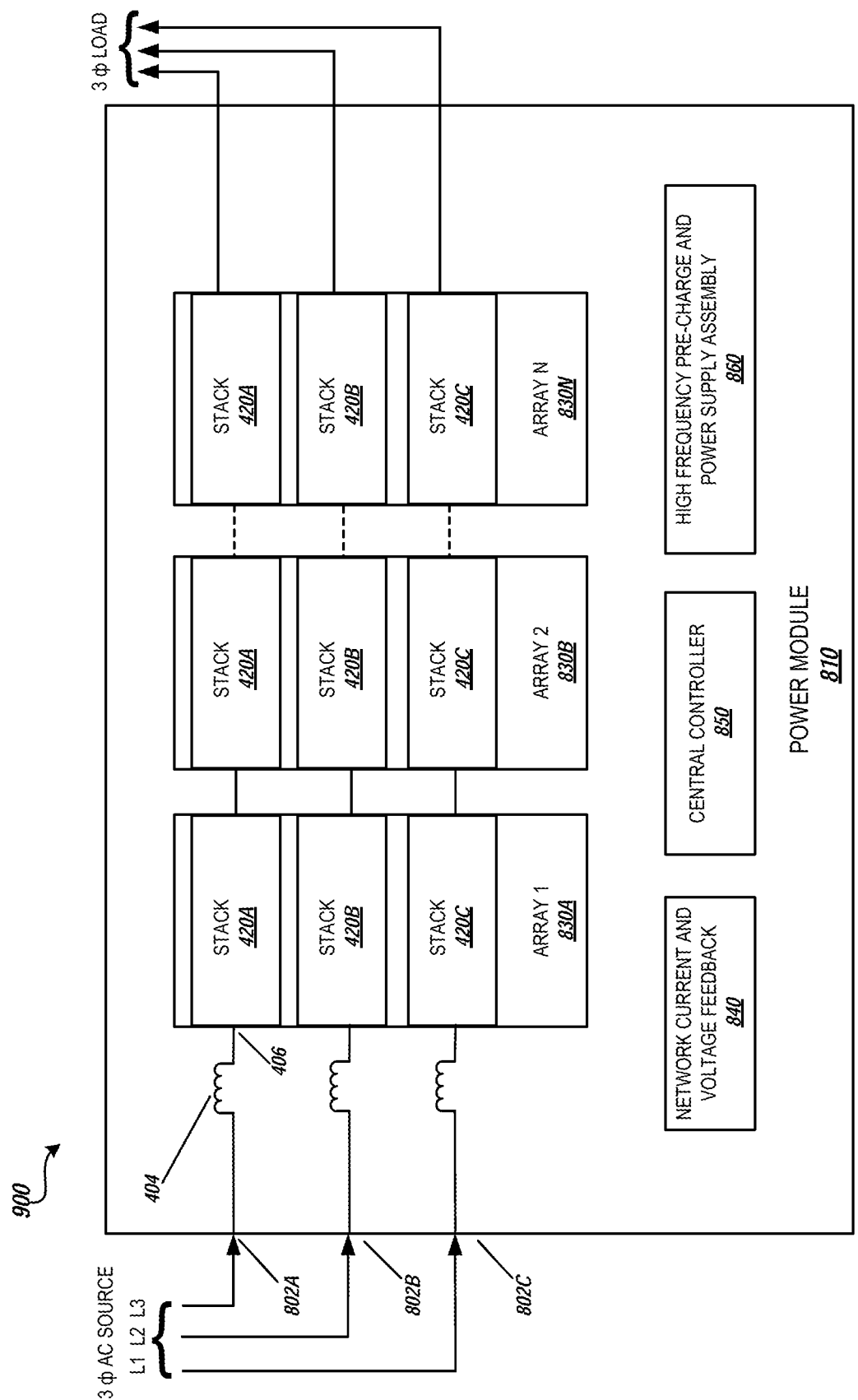
FIG. 9 depicts a block diagram illustrating one embodiment of a cascaded multi-level and multi-port power management system with synchronous common coupling in a power module, according to aspects of the present disclosure.

FIGS. 8 and 9 are block diagrams illustrating typical cascaded multi-level and multi-port power management systems 800 and 900 with synchronous common coupling 440, according to some embodiments described herein. FIG. 8 illustrates a cascaded multi-level and multi-port power management system 800 with synchronous common coupling 440 in a shunt application used for VAR compensation and line balancing, according to some embodiments described herein. FIG. 9 illustrates a cascaded multi-level and multi-port power management system 900 with synchronous common coupling 440 in a series application to provide power flow control, according to some embodiments described herein. According to some embodiments, each cascaded multi-level and multi-port power management system 800, 900 may be implemented with a 3-port system comprising one or more power module ports 802A-C with multiple arrays 830A-N in a series configuration. According to some embodiments, the power module 810 may be implemented with one or more arrays 830A-N, one or more current regulating reactors 404, and a high-frequency pre-charge and power supply assembly 860. In some embodiments, each cascaded multi-level and multi-port power management system 800, 900 may include network voltage and current feedback 840 and may comprise an enclosure with grounding provisions.

As shown in FIGS. 8 and 9, a multi-level and multi-port cascaded power management system 800, 900 may further comprise a central controller 850. According to some embodiments, the central controller 850 may coordinate operations of each stage 430, stack 420, and array 410 within the system to meet the network requirements. According to some embodiments, the central controller 850 may use average current mode controlled power factor correction algorithms, or the like. In some embodiments, numerous sources and loads may be connected within the power management system 800, 900, and there may be several power management systems operating with independent control, but working together as one large power management system which may be controlled by the central controller 850 to control power flow within the electrical network. In some embodiments, the central controller 850 is in communication with an energy network and may request to receive energy from the energy network. According to some embodiments, the central controller 850 may be configured to process and analyze the external network energy needs by either receiving requests from another entity, or determining requirements through evaluating current and voltage feedback magnitude, power factor, phase angle, harmonic content, sequence, frequency and other such characteristics feedback provided from the power flow within the external network.

Figure 10:
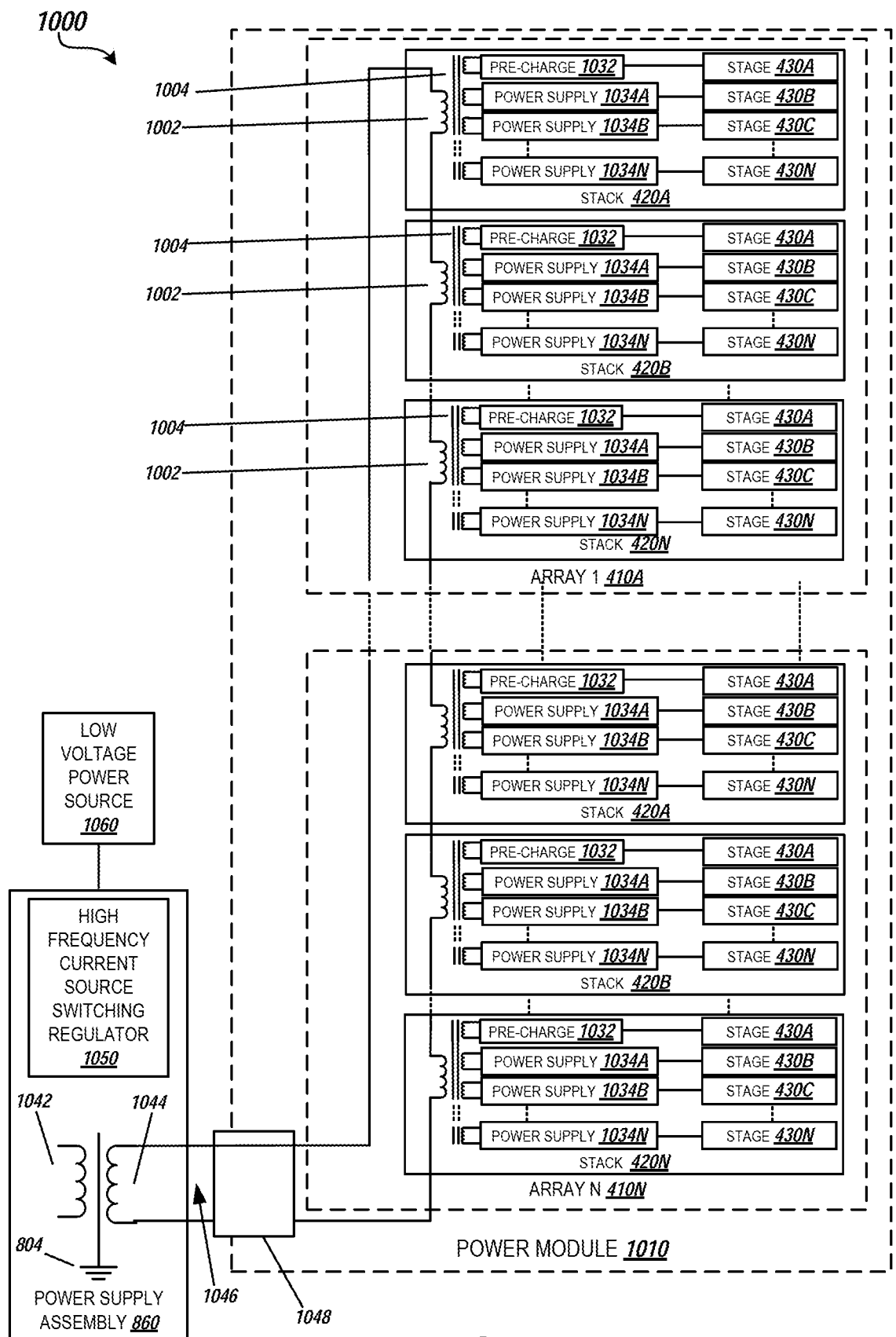
FIG. 10 depicts a block diagram illustrating one embodiment of a cascaded multi-level and multi-port power management system with synchronous common coupling with a high-frequency pre-charge and power supply assembly connected to a power module, according to aspects of the present disclosure.

FIG. 10 is a block diagram illustrating a cascaded multi-level and multi-port power management system 1000 with a high-frequency pre-charge and power supply assembly 860 connected to a power module 1010 with multiple stacks 420A-N comprising multiple stages 430A-N, according to some embodiments described herein. According to some embodiments, the high-frequency pre-charge and power supply assembly 860 may provide power to each stage 430A-N, stack 420A-N, array 410A-N, power module 1010, and the cascaded multi-level and multi-port power management system 1000 from a low voltage power source 1060 to fully test the assembly prior to applying high power. According to some embodiments, the high-frequency pre-charge and power supply assembly 860 may be implemented by connecting a low voltage source (e.g. battery or auxiliary power) to supply charging current and stage control power to each stage 430 within an array 410A-N.

According to some embodiments, the high-frequency pre-charge and power supply assembly 860 provides electrically isolated charging current to at least one DC bus 510 of one stage 430 within a stack 420A-N, and power is distributed within the array 410 by the synchronous common coupling 440 to prevent inrush current to the DC bus 510 when high power is connected. According to some embodiments, the pre-charge circuitry 1032 may be implemented to maintain the proper voltage in the stages 430 during an outage indefinitely if power is lost on one or more sources, so that they are prepared to return to proper function immediately upon restoration of power.

According the some embodiments, the high-frequency pre-charge and power supply assembly 860 may be implemented with a high voltage cable powered by a secondary of the high-frequency current source switching regulator 1050 with an isolation transformer 1042 to provide high-frequency current to a high voltage conductor 1046 that shunts the transformer secondary 1044. According to some embodiments, the high voltage conductor 1046 may serve as the primary winding 1002 to the cores 1004 with multi-winding secondaries mounted on each stack 420A-N. Further, the primary windings 1002 and cores 1004 may provide isolated power to the stage controller 550 within each stage 430A-N and pre-charge the pre-charge circuitry 1032 of at least one DC bus 510 of a stage 430 within each stack 420A-N. The synchronous common coupling 440 may distribute and balance DC bus power throughout each stage 430. According to some embodiments, at least one DC bus 510 of each stage 430 may be connected to the pre-charge circuitry 1032 such that all DC buses may be charged through the one stage 430 by the synchronous common coupling 440.

In some embodiments, the cascaded multi-level and multi-port power management system 1000 may supply balanced or unbalanced power to any port via the high-frequency pre-charge and power supply assembly 860. According to some embodiments, the system may comprise the addition of storage to give more flexibility in speed of response, which may emulate the inertia of synchronous machines. The higher the power, the more unbalance and regulation assistance the auxiliary, pre-charge, and a control port may provide. In some embodiments, the cascaded multi-level and multi-port power management system 1000 may reduce repair time because stages 430A-N, stacks 420A-N, arrays 410A-N, power modules 1010, and entire power management system assemblies can be tested anywhere by powering the pre-charge circuitry 1032 and high-frequency pre-charge and power supply assembly 860 with low voltage power from the low voltage power source 1060.

It will be appreciated that cascaded multi-level and multi-port power management systems 400, 600, 700, 800, 900, and 100 and power modules 810, 1010 may comprise any number of arrays 410, the arrays may comprise any number of stacks 420, the stacks may comprise any number of stages 430, and each system or component may comprise any number of ports, and they may be combined in various ways for various configurations of a power management system, according to the embodiments described herein.

Other aspects can comprise additional options or can omit certain options shown herein. One should note that conditional language, such as, among others, "can," "could," "might," or "may," unless specifically stated otherwise, or otherwise understood within the context as used, is generally intended to convey that certain aspects comprise, while other aspects do not comprise, certain features, elements and/or steps. Thus, such conditional language is not generally intended to imply that features, elements and/or steps are in any way required for one or more particular aspects or that one or more particular aspects necessarily comprise logic for deciding, with or without user input or prompting, whether these features, elements and/or steps are comprised or are to be performed in any particular aspect.

The description is provided as an enabling teaching of the present devices, systems, and/or methods in their best, currently known aspects. To this end, those skilled in the relevant art will recognize and appreciate that many changes can be made to the various aspects described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the description is provided as illustrative of the principles of the present disclosure and not in limitation thereof.

As used throughout, the singular forms "a," "an" and "the" comprise plural referents unless the context clearly dictates otherwise. Thus, for example, reference to a quantity of one of a particular element can comprise two or more such elements unless the context indicates otherwise. As used herein, the terms "optional" or "optionally" mean that the subsequently described event or circumstance may or may not occur, and that the description comprises instances where said event or circumstance occurs and instances where it does not.

It should be emphasized that the above-described examples are merely possible examples of implementations and set forth for a clear understanding of the present disclosure. Many variations and modifications can be made to the above-described examples without departing substantially from the spirit and principles of the present disclosure. Further, the scope of the present disclosure is intended to cover any and all appropriate combinations and sub-combinations of all elements, features, and aspects discussed above. All such appropriate modifications and variations are intended to be comprised within the scope of the present disclosure, and all possible claims to individual aspects or combinations of elements or steps are intended to be supported by the present disclosure.

What is claimed is:

1. A power management apparatus utilizing synchronous common coupling, the power management apparatus comprising:
    a plurality of ports; and
    a plurality of electrically isolated stacks connected through a synchronous common coupling, each electrically isolated stack of the plurality of electrically isolated stacks comprising a plurality of serially cascaded stages and connected to a source or load through one of the plurality of ports, each stage of the plurality of serially cascaded stages comprising a bidirectional flux bridge connecting the stage to the synchronous common coupling, wherein the synchronous common coupling connects only power bi-directionally between each of the plurality of electrically isolated stacks and is configured to maintain electrical isolation between the stages of each of the plurality of electrically isolated stacks.

2. The apparatus of claim 1, wherein each of the plurality of stages further comprises a source/load bridge and a direct current (DC) bus.

3. The apparatus of claim 2, wherein the source/load bridge is connected to a source or load through one of the plurality of ports, the bidirectional flux bridge is connected to the synchronous common coupling through an external winding, and the bidirectional flux bridge is further connected to the source/load bridge through the DC bus.

4. The apparatus of claim 3, wherein the bidirectional flux bridge is configured to be synchronously operated as a resonant circuit with at least one of an optional capacitor and an external inductor connected in series with the external winding.

5. The apparatus of claim 4, wherein the bidirectional flux bridge is further configured to be synchronously operated as a hard switched circuit with the external winding.

6. The apparatus of claim 1, wherein the synchronous common coupling comprises a single common flux core, and wherein each of the plurality of stages is connected to an electrically isolated winding on the single common flux core.

7. The apparatus of claim 1, wherein the synchronous common coupling comprises a high-frequency current bus, and wherein each of the plurality of stages is connected to the high-frequency current bus through a separate transformer.

8. The apparatus of claim 1, further configured to dynamically connect each of the plurality of electrically isolated stacks to one of the plurality of ports.

9. The apparatus of claim 1, wherein the plurality of stages comprise control circuitry to control power through each stage.

10. A method of utilizing synchronous common coupling for power management, the method comprising the steps of:
receiving power from a source through at least one of a plurality of ports, wherein at least one of the plurality of ports is connected to a load; and
controlling, by control circuitry, the power through a plurality of electrically isolated stacks connected through a synchronous common coupling, each electrically isolated stack comprising a plurality of serially cascaded stages and connected to a source or load through one of the plurality of ports, each of the plurality of stages comprising a bidirectional flux bridge connecting the stage to the synchronous common coupling, wherein the synchronous common coupling connects only power bi-directionally between each of the plurality of electrically isolated stacks and is configured to maintain electrical isolation between the stages of each of the plurality of electrically isolated.

11. The method of claim 10, wherein each of the plurality of stages further comprises a source/load bridge and a direct current (DC) bus.

12. The method of claim 11, wherein the source/load bridge is connected to a source or load through one of the plurality of ports, the bidirectional flux bridge is connected to an electrically isolated winding in the synchronous common coupling, and the bidirectional flux bridge is further connected to the source/load bridge through the DC bus.

13. The method of claim 12, wherein each of the plurality of stages comprises control circuitry to control power through the stage.

14. The method of claim 13, wherein the control circuitry is further configured to control the bidirectional flux bridge of the stage to synchronize power with the synchronous common coupling.

15. The method of claim 10, wherein the synchronous common coupling comprises a single common flux core, and wherein each of the plurality of stages is connected to an electrically isolated winding on the single common flux core.

16. The method of claim 10, wherein the synchronous common coupling comprises a high-frequency current bus, and wherein each of the plurality of stages is connected to the high-frequency current bus through a separate transformer.

17. A power management array utilizing synchronous common coupling, the power management array comprising:
three ports;
a synchronous common coupling; and
three electrically isolated stacks connected through the synchronous common coupling, each of the three electrically isolated stacks connected to a separate phase of a three-phase electrical network through one of the three ports, each electrically isolated stack comprising a plurality of serially cascaded stages, each stage comprising a source/load bridge, a bidirectional flux bridge connected to an electrically isolated winding in the synchronous common coupling, and a direct current (DC) bus, wherein the synchronous common coupling connects only power bi-directionally between each of the electrically isolated stacks and is configured to maintain electrical isolation for each of the plurality of stages in the electrically isolated stacks.

18. The power management array of claim 17, further comprising a central controller configured to control and synchronize each of the electrically isolated stack.

19. The power management array of claim 18, wherein each stage comprises a stage controller, wherein the central controller synchronizes each electrically isolated stack utilizing the stage controller of each stage.

\* \* \* \* \*